Jan. 3, 1967    L. E. DE NEERGAARD    3,295,214
ELEMENT FOR MEASURING DISPLACEMENTS
Original Filed April 7, 1958    6 Sheets-Sheet 1

United States Patent Office 3,295,214
Patented Jan. 3, 1967

3,295,214
ELEMENT FOR MEASURING DISPLACEMENTS
Leif Eric De Neergaard, deceased, late of Madison, Wis., by The Northern Trust Co., executor, Chicago, Ill., assignor to Frederic W. Olmstead, Washington, D.C., Hans W. Trechsel, % The Gisholt Machine Company, Madison, Wis., Deryck A. Gerard, Minneapolis, Minn., and Norman S. Parker, Evanston, Ill., as trustees
Application May 9, 1962, Ser. No. 201,226, now Patent No. 3,230,827, dated Jan. 25, 1966, which is a division of application Ser. No. 726,998, Apr. 7, 1958, now Patent No. 3,076,374, dated Feb. 5, 1963. Divided and this application Feb. 5, 1965, Ser. No. 441,396
2 Claims. (Cl. 33—125)

This application is a division of application Serial No. 201,226, filed may 9, 1962, now Patent 3,230,827. Application Serial No. 201,226, is a division of application Serial No. 726,998, filed April 7, 1958, now Patent 3,076,374. Application Serial No. 726,998 is a continuation-in-part of application Serial No. 137,159, filed January 6, 1950, now forfeited, and application Serial No. 527,719, filed August 11, 1955, now abandoned.

This invention relates to measuring apparatus, and is more particularly illustrated in connection with apparatus for measuring linear displacements such as the length, width, thickness, depth, diameter and similar measurements of articles of manufacture as they are being machined, fabricated or inspected.

A lead-screw with a highly accurate thread generated along its length, operating in conjunction with precision machined coacting nut, is frequently used in machine tools such as lathes, grinders, milling machines and similar fabricating machines to simultaneously control and measure the displacements of work-to-tool or tool-to-work members while an article of manufacture is being processed. Smaller screws also with coacting nuts are also used as the basic measuring elements in the well known micrometer extensively used in gauging dimensions of work either in process or in final inspection. Since the internal thread of the nut is in actual physical contact with the thread of the lead-screw, it is apparent that this metal to metal contact will induce friction and therefore wear betwen these elements, and since the accuracy of a lead-screw and its coacting nut is dependent upon the integrity of their dimensions, it is apparent that, due to this wear, their value in accurately measuring linear displacements or dimensions diminishes as these elements are used. This wear is most pronounced in situations where rotation of the lead-screw is not only used for measuring linear displacements but also as the means for advancing tool-to-work or work-to-tool members. Thus, a lead-screw controlling the movement of the slide of a lathe for example loses its high degree of accuracy in a short time due to wear of the lead-screw and coacting nut caused by the resistance of the cutting tool as it is forced into the stock being machined.

Scales equipped with vernier attachments are also commonly used in measuring linear displacements of carriages, slides, and similar too-to-work or work-to-tool members of machine tools, as well as in bench inspection. Such measuring devices entail the use of considerable skill in making accurate readings even when a high powered magnifying glass is used, and cannot, as a rule, be read with accuracies of greater than plus or minus one or two ten-thousands of an inch, and inasmuch as the human element is a great factor in making close vernier readings, it is often possible for two skilled machinists to identify the same reading differently.

Dial gauges are frequently used in inspection work to measure very small linear displacements, although their total range of operation is generally in the order of but one or two hundredths of an inch. Such a gauge uses a delicate mechanism to mechanically magnify movement between the gauge button and the indicating pointer. These gauges soon lose their accuracy, while rough handling or an accidental blow will often completely destroy their utility.

Sets of gauge blocks of various lengths, made of specially selected and aged steel, and finished to such close tolerances as two or three millionths of an inch in the dimension between their parallel faces, are extensively used in tool rooms for inspection and layout work requiring high limits of accuracy. In use, blocks of various known lengths are stacked or "wrung" together until the overall length of the stack equals the desired measurement. These gauge blocks although highly accurate under certain conditions of use are extremely expensive. Not only does this factor limit their use in ordinary inspection and layout, but the excessive time used in selecting the proper gauge blocks and "wringing" them together makes their use for many operations entirely impractical.

Another shortcoming of gauge blocks is that after use for a considerable length of time the blocks wear due to rubbing action when they are "wrung" together with an attendant reduction in their accuracies.

An important object of this invention is an apparatus for making linear measurements in which there is absolutely no physical contact between the measuring elements. Thus, the accuracy of the device is absolutely unimpaired with use.

Another important object is a measuring apparatus whose visual indicating means can be remotely located from the point where the measurement is being made. Thus, the indicating means can be placed at any desired location on a machine tool where it can be most efficiently read by the operator.

Yet another important object is means by whose use measuring apparatus can be constructed which is capable of instantaneously and continuously indicating linear displacements within the range of the device in units, tenths, hundredths, thousandths and ten thousandths of an inch any linear displacement of a lathe carriage along the length of a lathe bed which, in some instances, may measure hundreds of inches in length.

Another important object obtained by the use of the means comprising this invention consists of a system of linear measurement in which a very small measured displacement can be magnified at the visual indicating means by a factor of 1,000, 10,000, or even more if desired. Thus, a measured linear displacement of .0001 inch, for example, can cause the indicating means to move through a distance of one inch or more, depending on the magnification factor used in the design of a specific measuring apparatus. This great magnification allows large and well spaced numerical characters to be printed or etched on the dials of the indicator. It is obvious that large characters make for extreme ease in reading thus reducing operator fatigue, and chances of errors, to a minimum.

Another object is a system for measuring and continuously indicating linear displacements in which any displacement in one direction of a measuring element along the length of a meter bar, to be later described, causes an indicator to instantly and automatically present a visual reading which is increased in precise proportion to the magnitude of the additional linear displacement, which opposite displacement of the measuring element causes an instant change in the indicated reading proportional to the reverse or negative displacement being measured.

Another object is a highly accurate apparatus for measuring and visually indicating linear displacements in which but three moving elements are used in a device of the simplest form.

Another object is an apparatus for measuring and indicating linear displacement whose measuring elements are at no time compressed, or otherwise stressed while the device is being used.

Another object is an apparatus for measuring linear displacements in which any displacements of a measuring element in a certain direction along the length of a meter bar can, at the will of the operator, be made to cause either additive or subtractive registration at the visual indicating instrument.

Another object is a system for measuring and indicating linear displacements in which a species of dual alternator is used to simultaneously generate a reference alternating current and a variable phase alternating current in such a manner that the phase relationship of one alternating current to the other is absolutely independent of the rate of rotation of the rotor of the dual alternator from instant to instant.

Another object is a system for measuring linear displacements which allows the use of a plurality of visual indicating instruments located at points remote to each other but arranged to simultaneously indicate the magnitude of any linear displacement being measured by the measuring elements.

Another object is mechanisms for translating a phase change in a signal generated from two lineally arranged signal generating elements into a visual representation of a distance of displacement being measured.

Another object is a measuring system which with a single series of spaced flux areas on an elongated signal generating element, provides signals of different frequencies with one frequency being a constant multiple of the other.

Another object is to provide greater dimensional stability to a measuring system.

Another object is a mechanism which may present a reading of a distance being measured in terms of inches and fractions of inches.

Another object is a system for counting the number of flux transmissive areas that move past a scanning assembly.

Other objects will appear from time to time in the ensuing specification and drawings, in which.

The drawings illustrate a system adopted to continuously measure and visually indicate any linear displacements within the range of the system.

Figures 1, 2, 3, 4, 5:
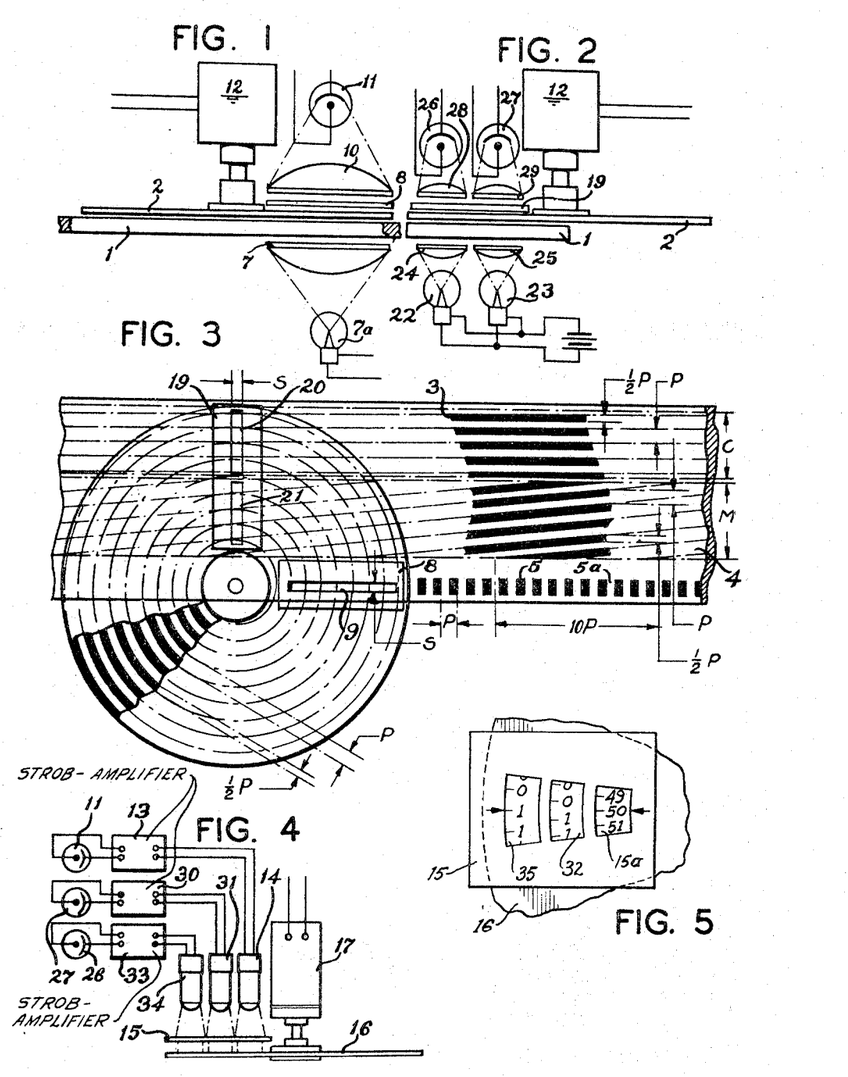
FIGURE 1 is an elevation view of one embodiment of the invention.
FIGURE 2 is a side elevation of the embodiment shown in FIGURE 1.
FIGURE 3 is a plan view of the embodiment shown in FIGURES 1 and 2.
FIGURE 4 is a diagrammatic illustration of an indicating system employed with the embodiment of FIGURES 1 through 3.
FIGURE 5 is a detail view of an indicating instrument employed with FIGURE 4.

Referring specifically now to FIGURE 1, a first measuring element 1 is illustrated which takes the form of an elongated and lineally extending transparent member. It may take the form of an elongated glass bar. A second measuring element is formed by a scanning disc 2 which is positioned closely adjacent to the surface of the elongated meter bar or member 1 but is spaced a slight distance therefrom which will be apparent in FIGURES 1 and 2. The meter bar 1 has a first series of elongated and generally parallel flux conductive areas thereon represented generally at 3 defining a channel C, a second series of flux conductive elements 4 defining a channel M, and a third series of flux conductive elements 5. It should be noted that the first series of flux conductive elements 3 have a slight slope with respect to the edge of the meter bar, the second series has a greater slope than the first and that the third series 5 is formed of transversely extending elements which are spaced along the length of the meter bar.

According to the principles of the invention, these flux conductive areas in the embodiment illustrated in FIGURES 1, 2 and 3 are formed by alternate opaque and transparent areas on the meter bar so that light may be projected through the transparent areas. In this embodiment of the invention the pitch of these areas or the distance from the center line of one area to the center line of an adjacent similar area is equal in each of the series 3, 4 and 5 and each area has a width equal to one-half the pitch "P." The pitch may be taken to be a predetermined unit of linear measurement such as for example, $\frac{1}{10}$ of an inch, so that in the series 5 there are ten similar areas per inch. According to the principles of the invention, the scanning member 2 has alternate opaque and transparent sections thereon formed by the convolutions of an opaque spiral extending around the axis of the scanner 2. The transparent convolutions form another series of light flux transmissive areas opposed to the series on the meter bar. The pitch "P" of the convolutions is equal to the pitch "P" of the opaque areas on the meter bar or meter ribbon and the width of these areas is equal to the width of the areas on the meter bar or ½ "P."

A light source 7a is positioned beneath the series 5 and projects light through a lens 7 and through a plurality of the transparent or light flux conductive areas 5a in the series 5. This light passes through the transparent convolutions of the spiral formed on the scanner and through a light shield 8 which has a slot 9 extending over a plurality of the light transmissive areas in the series 5 and along the length of the series. The light passing through the series 5 and through the transparent areas of the scanner 2 and slot 9 is received by a lens 10 and focused on a photocell 11. Thus it will be seen that the amount of light received by the photocell and the resulting current transmitted by the photocell will be dependent on the relative position of the convolutions of the spiral on the scanner 2 and the areas in the series 5.

According to the invention, the scanner 2 is driven by a synchronous motor 12 at a predetermined speed, say for example, 60 revolutions per second. If the scanner 2 is rotated in a counterclockwise direction in FIGURE 3 the convolutions of the spiral at that position over the slot 9 will appear to move from right to left at the rate of 60 pitches per second. This has the effect of alternately increasing and diminishing the amount of light flux passing through the areas of the spiral at the scanning rate or 60 times per second. Thus the photocell will transmit a signal having a frequency corresponding to the scanning rate or 60 cycles per second.

If the meter bar 1 and the scanner 2 are moved bodily relative to one another in a direction parallel to the length of the bar 1 while the scanning action is taking place, frequency shift in the signal results. For example, if the member 1 is moved to the left a distance equal to one pitch during one second of time, the resultant frequency will be 59 cycles per second. If the member 1 is moved to the right, the resultant frequency will be 61 cycles per second. In other words, relative movement equal to one pitch of 1/10 of an inch is equal to a 360 degree phase change in the signal generated.

It should be understood that the relative movement need not occur in any given period of time. It may take place gradually or quickly. The relative movement has been mentioned as occurring in one second of time for purposes of description. Furthermore, any relative movement less than that stated or less than 1/10 of an inch brings about a proportionally smaller phase change in the signal generated. The signal transmitted by the photocell 11 is amplified and translated to a pulse as at 13 and is supplied to a stroboscopic light source 14. The light source 14 is employed to illuminate through a shield 15 a portion 15a of an indicating disc 16 which is rotated by a synchronous motor 17. The synchronous motor 17 is supplied with current from the same source as supplies the motor 12 so that the disc 16 is driven at the same rotational speed as the scanner 2. The light source 14 illuminates one portion of the disc indicated at 16 and which may be calibrated in hundredths of the unit of measurement employed in spacing the series of light flux transmissive elements 5a. Since the signal supplied to the stroboscopic light source 14 has the same frequency as the scanning rate during such times that the scanner and meter ribbon are stationary relative to one another, the pulse light from the light source will optically stop the disc and illuminate the same portion of the disc at a frequency corresponding to the frequency generated. However, when the signal to the stroboscopic light source 14 undergoes a phase change which results from the aforementioned bodily relative movement, the light will fire at a different time and thus illuminate a different portion of the indicating disc. This gives a different reading.

A second light shield 19 is positioned over the series 3 and 4. The light shield 19 includes a light aperture in the form of a slot 20 positioned transversely of the member 1 and over the series 3, and a second slot 21 positioned over the series 4. Light sources 22 and 23 project light through lenses 24 and 25 positioned beneath these slots, through the transparent convolutions of the spiral and to photocells 26 and 27 respectively. Lenses 28 and 29 may be positioned between the shield 19 and the photocells 26 and 27 so as to focus light on the photocells 26 and 27. The convolutions of the spiral of the scanner serve to modulate the light flux transmitted through the series 3 and 4 in a manner similar to the scanning action over the series 5. The scanning action is, in this instance however, transversely of the meter bar 1 and if the scanning disc 2 is rotated in a counterclockwise direction as seen in FIGURE 3, the scanning action will take place radially inwardly and transversely of the meter bar in FIGURE 3.

The series of flux conductive areas 3 are given a gradual slope with respect to the longitudinal axis of the member 1. Preferably they are given a slope of one pitch measured transversely of the member 1 for every ten inches of length of the member. The series 4, on the other hand, has a slope equal to one pitch for every one inch length of the member 1. Thus the distance between center lines of the areas in the series 3 and 4, measured longitudinally of the member 1, is equal to multiples of the units of measurement employed with the series 5.

When the scanner 2 is rotated at the given speed, for example, 60 revolutions per second, the signals generated by the photocells 26 and 27 will be 60 cycles per second. Then, if the scanner 2 and member 1 are given a relative bodily movement from left to right or from right to left in FIGURE 3, the areas of the series 3 and the areas of the series 4 will appear to move transversely under the slots 20 and 21 and will move apparently in a direction according to the direction of such relative movement. In the case of the series 3, a ten-inch relative bodily movement is necessary to cause a displacement of the areas (parallel to the direction of scanning) equal to one pitch and this will bring about a 360 degree phase change in the signal transmitted by the photocell 26. In the case of the series 4, a one-inch relative bodily movement between the scanner 2 and member 1 causes a displacement of one pitch and this will bring about a 360 degree phase change in the signal generated and transmitted through the photocell 27. In the event of a lesser displacement, the phase change transmitted by the photocells 26 and 27 is proportionately lesser.

The signal generated and transmitted through the photocell 27 is amplified as at 30 and supplied to a stroboscopic light source 21 which is employed to illuminate a portion 32 on the disc 16. The signal generated and transmitted by the photocell 26 is amplified as at 33 and supplied to a third stroboscopic light source 34 which serves to illuminate a third indicating portion 35 carried by the disc 16.

Each of the portions 15a, 32 and 35 carry calibrations spaced in circles about the axis of the disc 16. The 360 degrees of calibrations in the portions 15a, 32 and 35 are equivalent to one tenth of an inch, one inch and ten inches respectively.

Since the series 3 in the C channel or track requires a ten-inch longitudinal movement to bring about a 360 degree phase change, the portion 35 may be calibrated in inches from zero to ten with ten zeros, ten ones, ten twos, etc., as shown. Since the series 4 in the M channel or track requires a one-inch movement to bring about a 360 degree phase change, the portion 32 may be calibrated in tenths of an inch from zero to ten with ten zeros, ten ones, ten twos, etc., as shown.

Thus the signal generating elements formed by the scanner 2 and member 1 cooperate to bring about a phase change in a cyclic signal which is precisely proportional to the displacement of the member 1 relative to the scanner 2. Under some circumstances, it may be desirable to maintain the element or member 1 in a static position. The phase chance is then effected by bodily moving the scanning assembly comprised of the scanner 2 and motor 12. A predetermined phase change, as for example 360 electrical degrees, in each of the signals generated is equivalent to a predetermined unit of measurement or a predetermined multiple or submultiple of the unit of measurement.

Figure 6:
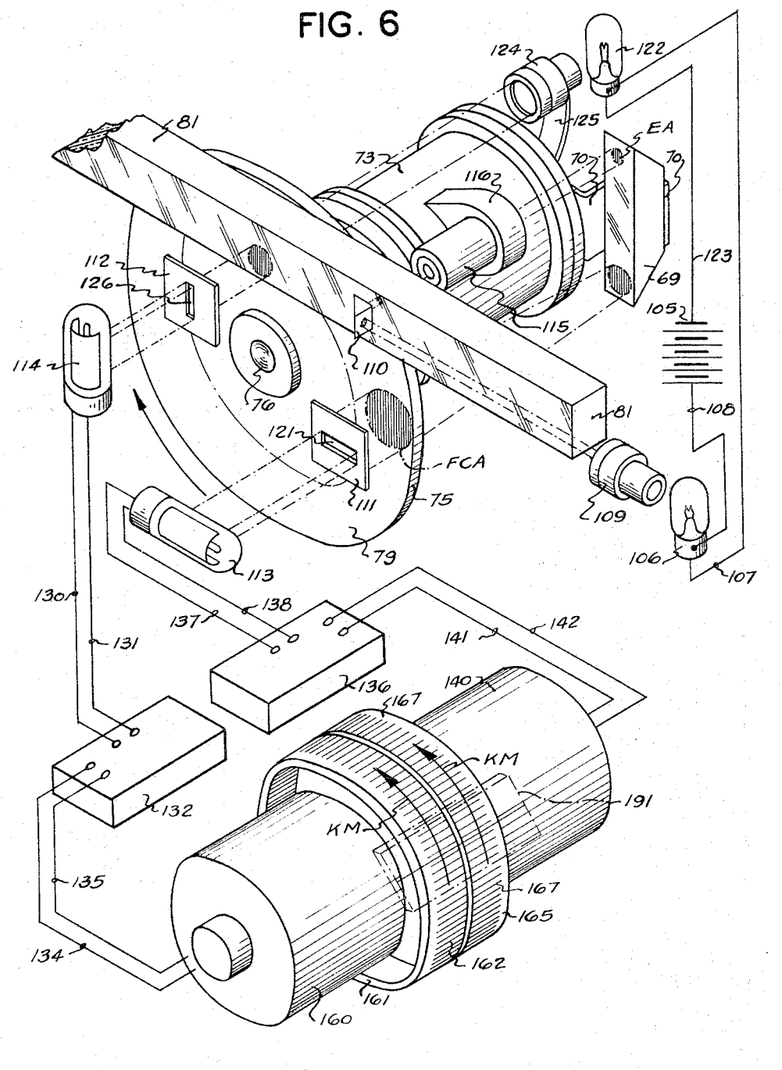
FIGURE 6 is a variation of the measuring and indicating system.

A variation is shown in FIGURES 6 through 11 inclusive. In FIGURE 6 a circular disc 75, preferably made of transparent optical glass, is concentrically mounted integral to the rotor shaft 76 of a two-pole synchronous motor 73, which rotates at a rate of 60 r.p.s. or 3600 r.p.m. when its field windings are excited with 60 cycle alternating current.

Figures 7, 8:
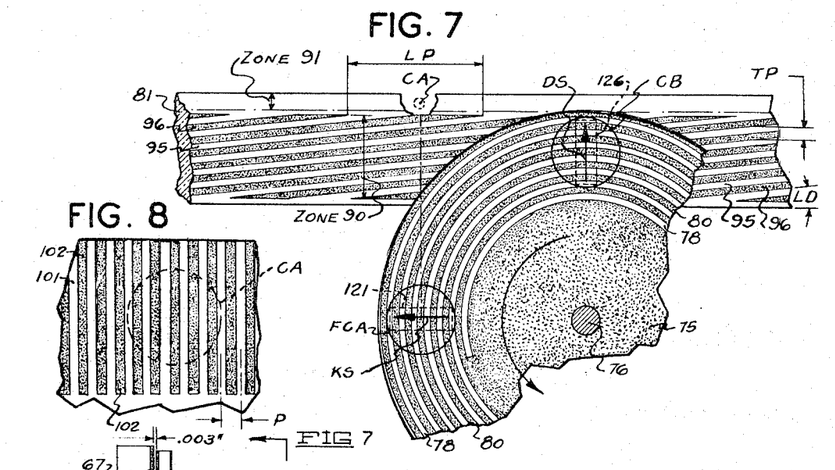
FIGURE 7 shows in broken section two elements of the system illustrated in FIGURE 6.
FIGURE 8 illustrates a broken section of one of the elements used in the system illustrated in FIGURE 6.
Figures 9, 10:
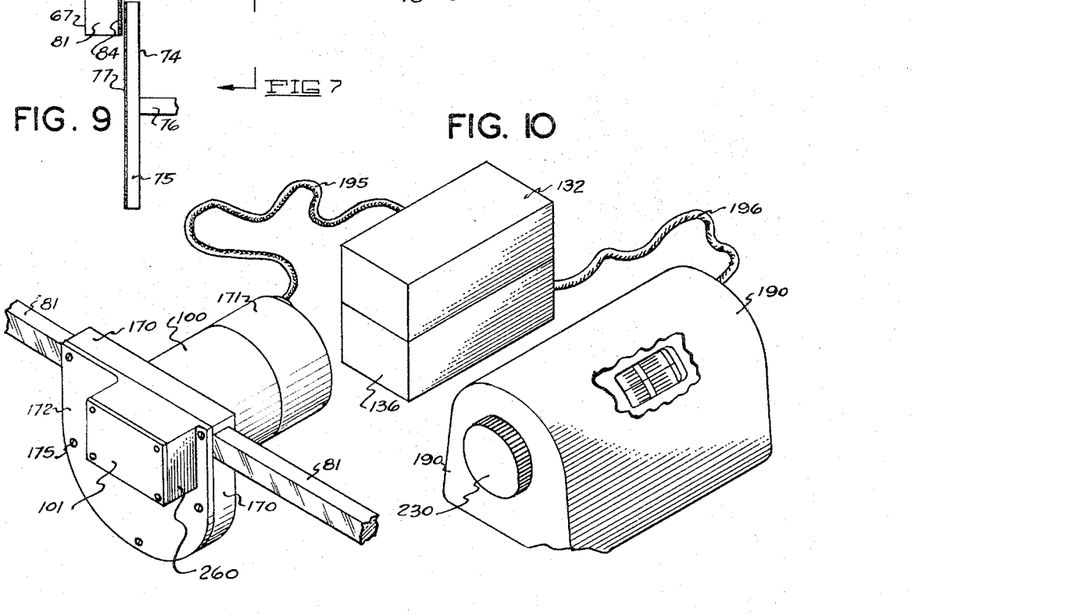
FIGURE 9 illustrates in elevation and relationship of two elements used by the system illustrated in FIGURE 6.
FIGURE 10 is a perspective illustration of certain housings in which the elements of the system illustrated in FIGURE 6 are enclosed.

The plano-face 79 (farthest from motor 73) of disc 75, FIGURES 6 and 7, is made opaque by the application of a thin coat of lacquer, silver, aluminum or similar light-non-transmissive material. By means of a cutting tool some of this material is removed to create a single multiconvolution Archimedes' spiral. The pitch of this transparent spiral 78, FIGURE 7, will be considered exactly .1000" while its width is 0.0500". Obviously an opaque spiral 80 whose width is also 0.0500" will separate the convolutions of the transparent spiral as shown in FIGURE 7 which illustrates a broken section of disc 75 and a meter bar 81 viewed through the transparent face 74 of the disc as indicated in FIGURE 9.

The meter bar 81, FIGURE 6, is slidably supported by case 170, FIGURE 10, in a manner to be later described. The meter bar may be displaced in either direction along its longitudinal axis which in FIGURE 6 extends in a horizontal plane. The vertical face 84 is maintained in precise parallelism with plano-face 79 of disc 75, FIGURE 9. This figure indicates that a gap of approximately .003" may separate these two adjacent faces. Face 84 of meter bar is made opaque in the same manner plano-face 79 of the disc was rendered nontransmissive to light. FIGURE 7 illustrates that face 84 is divided into two parallel zones 90 and 91 which extend along the length of the meter bar.

Spaced parallel transparent channels 95 are cut through the laquer coacting zone 90. These channels are diagonally displaced in relation to the longitudinal axis of meter bar 81. It will be assumed that the transverse pitch T.P., FIGURE 7, measured transverse to the axis of the meter bar is .1000" while the longitudinal pitch L.P. measured parallel to the meter bar axis is 1.0000". The angle of lateral displacement L.D. equals 5 degrees, 42 minutes(+)

$$\text{since } \frac{\text{T.P.}}{\text{L.P.}} = \frac{.1000}{1.000} = .1000 = \text{tangent of } 5° 42'(+)$$

Zone 91, shown on an enlarged scale in FIGURE 8, is divided into alternate transparent channels 101 and opaque channels 102. The pitch of the transparent channels, which extend transverse to the meter bar longitudinal axis is exactly .0100" while the width of both opaque and transparent channels 102 and 101, respectively, is exactly .0050".

Figure 11:
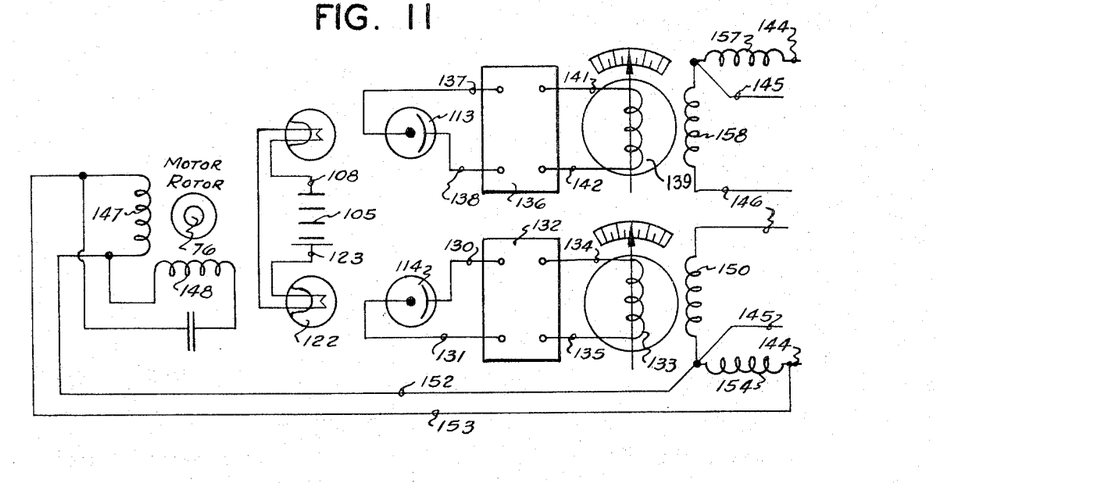
FIGURE 11 is a schematic illustration of the electronic and electrical systems utilized in the system illustrated in FIGURE 6.

Current from a battery 105, FIGURES 6 and 11, is conducted to a filament type lamp 106 by suitable leads 107 and 108. Luminosity from the lamp is collimated by an optical condensing system 109 and projected through a roof-prism 110 made of optical glass. The roof-prism 110 bands the projected light so that it passes through the meter bar normal to its vertical faces. Therefore, area CA, FIGURES 7 and 8, lying in zone 91 is brilliantly illustrated and serves as the real image of an optical magnifying system 115 rigidly supported by bracket 116 integral to the frame of motor 73. The magnification factor of the magnifying system will be taken to be exactly 10 diameters. The projected light is deflected downward and then horizontally by the two 45° faces of prism 69 which is made of optical glass and is rigidly supported by a suitable metal bracket 70 fastened integral to motor 73.

The projected luminosity is caused to fall on area FCA on the plano face 79 of disc 75. Area FCA is also located at the focal point of the magnification system. Therefore the magnified images of channels 102 lying within area CA are brought to sharp focus and are superimposed upon the spiral convolutions occupying area FCA. The pitch and width of the magnified channels 102 will exactly equal the .1000" pitch and .0500" width of the spiral convolutions when measured at area FCA.

A light-stop 111, FIGURE 6, preferably made of sheet metal, is rigidly supported with its plane parallel to and separated from the vertical face 67, FIGURE 9, of meter bar 81 by a suitable distance. An aperture 121 whose length extends horizontally is cut through or otherwise suitably formed this light-stop. From FIGURE 7 it will be seen that the aperture is symmetrically located in relation to area FCA. The aperture length should preferably exactly equal a whole number of pitches of the spiral. Thus in FIGURE 7 the length of aperture 121 may equal exactly 5 pitches or $5 \times .100 = .500"$. The width of this aperture may be equal to two pitches or in the specific illustration $2 \times .100 = .200"$. Any light projected through aperture 121 falls upon the light-sensitive areas of a photo tube 113 whose operation will be later discussed. Although not shown, the lamp 106, condensing system 109, roof-prism 110, light stop 111 and photo tube 113, FIGURE 6, are rigidly supported within a suitable case 172, FIGURE 10.

Current from battery 105, FIGURES 6 and 11, is led by conductors 107 and 123 to a filament type lamp 122 whose luminosity is collimated by a condensing system 124 rigidly supported by a suitable metal bracket 125 mounted on the motor frame 73. The horizontally projected light passes normal to and through the plano-faces of disc 75 and the vertical faces 84 and 67 of the meter bar to illuminate the circular area CB upon which it falls. CB will be considered to lie on plano-face 77 of the disc 75 and the vertical face 84 of meter bar 81. A second light stop 112 which may be identical to light stop 111 is mounted on the cover plate 101, FIGURES 10 and 15. An aperture 126 is cut in the light stop 112. The dimensions of this aperture may be identical to aperture 121 in light stop 111 already described. The aperture 126 extends vertically and is symmetrically arranged in relation to area CB, FIGURE 7. For clarity, the outlines of light stops 111 and 112 have been omitted from this figure. Any light projected through aperture 126 falls upon the light sensitive areas of a photo tube 114 whose functioning will be later described.

As shown in FIGURES 6 and 11 the output of photo tube 114 is led to an electronic amplifier 132 through suitable leads 130 and 131. The output of this amplifier is led to the rotor winding 133 of a phase angle meter (see FIGURE 11) by means of suitable conductors 134 and 135. Similarly the output of photo tube 113 is led to the amplifier 136 through suitable insulated conductors 137 and 138. Rotor winding 139 of a second phase angle meter is supplied with the output of amplifier 136 conducted through suitable leads 141 and 142.

FIGURE 11 schematically illustrates the electronic and electrical systems for the operation of the measuring system. Two phase 60 cycle alternating current is conducted to the system by means of suitable insulated leads 144, 145 and 146. Single phase 60 cycle alternating current is led from one of the phases of the two phase alternating current by suitable conductors 152 and 153 to the field windings 147 and 148 of the two pole synchronous motor 73, FIGURE 6. Rotor shaft 76 and disc 75 will therefore be rotated at 60 r.p.s. when the motor is energized and with proper polarity connections in the directions indicated in FIGURES 6 and 7.

A phase angle meter is schematically illustrated in the lower right hand corner of FIGURE 11. Its stator windings are separately energized with two phase alternating current. Thus, stator winding 150 is excited with one phase by leads 145 and 146 while winding 154 is supplied with the other phase by conductors 144 and 145. It will be noted from FIGURE 6 that lead 145 is common to both phases of the two phase A.C.

The stator windings 157 and 158 of a second phase angle meter schematically illustrated in the upper right hand corner of FIGURE 11 are separately energized with the same two phase alternating current. Thus stator winding 157 is energized with one phase of the two phase A.C. by conductors 144 and 145 while the other phase is led to stator winding 158 by suitable insulated conductors 145 and 146.

Since the construction and operation of phase-angle meters are well known and since such instruments are readily obtainable from commercial sources it is not considered necessary to describe these devices at great length.

The rotor winding of such an instrument is supplied with an alternating current whose phase is variable but whose frequency is the same as that of a two phase alternating current whose phases separately excite two stator windings of the meter. The two-phase alternating current may be considered the reference signal since it serves as a time axis in relation to which any time or phase displacement of the variable phase alternating current is measured. Upon the variable phase alternating current being gradually displaced through 360 electrical degrees in relation to the reference signal it will be found that the rotor winding of the meter will gradually rotate through an angle of exactly 360 degrees.

Returning to FIGURE 11, rotor winding 133 is rotatably supported by anti-friction bearings and is supplied with the variable phase alternating current through suitable slip rings and brushes. These elements are enclosed in the housings 160, FIGURE 6, which also encloses the stator windings 150–154. The phase angle meter encased in housing 160 will hereafter be alluded to as the coarse meter whose operation controls the angular position of an indicating drum 161, FIGURE 6, which will be later fully described.

In an identical manner the elements of the phase angle meter schematically illustrated in the upper right hand corner of FIGURE 11 are enclosed in housing 140. FIGURE 6. This second phase angle meter whose operation controls the angular displacement of indicating drum 165, FIGURE 6, will hereafter be alluded to as the vernier or fine meter.

FIGURE 10 illustrates the housings which enclose the measuring head, amplifiers and indicating instruments. The measuring head which completely encloses the elements of the measuring device illustrated in the upper half of FIGURE 6 may be comprised of a main housing 100, and bell 171, end plate 172 and cover plate 101. These units are preferably made of ferro-magnetic material such as cast iron or steel in order to prevent extraneous magnetic fields from disturbing the electrical elements enclosed in the measuring head.

End bell 171 is preferably demountable from housing 100 to afford access to lamp 122, FIGURE 6. The end of housing 100 which rigidly supports motor 73 opposite to the end bell terminates in an integral semi-cylindrical element 170 whose vertical surface is machined to afford a surface to which end plate 172 can be rigidly secured by means of suitable screws 175. A box-like element 260 is provided integral to end plate 172 as illustrated, in which photo tubes 113 and 114, light stops 111 and 112, lamp 106, condensing system 109 and roof prism 110 may be rigidly mounted. The box-like element 260 is closed by means of the cover plate 101.

Figure 14:
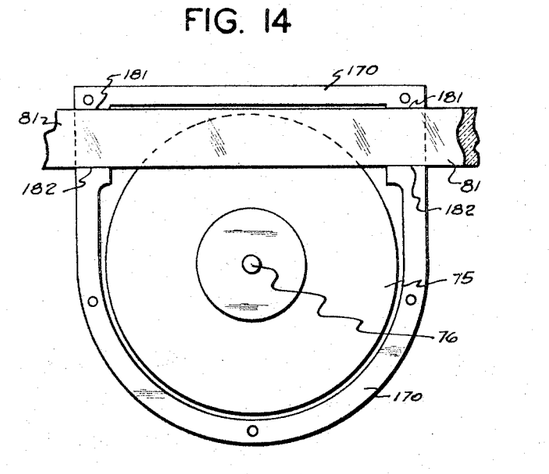
FIGURE 14 is an elevation of one end of a housing illustrated in FIGURE 10.

FIGURE 14 is an end view of main housing 100 looking towards motor 73 and with end plate 172. Two oppositely located slots are milled in the semi-cylindrical end 170 of the main housing. The horizontal surfaces 181 and 182 of the slots slidably support the meter bar 81. The plane surface of end plate 172 which bears against the end of main housing 100 is machined and ground. The depths of the two milled slots is such that with the meter bar 81 and cover plate in place a clearance on the order of .0010" will be maintained between the surfaces of the meter bar and the supporting surfaces.

Figure 15:
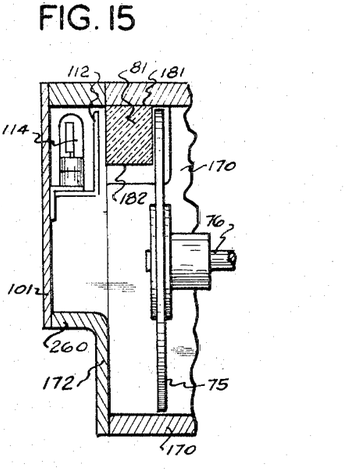
FIGURE 15 is a cross section taken in a vertical plane through one end of a housing illustrated in FIGURES 10 and 14.

FIGURE 15 is a cross section through the cover plate 101, end plate 172 and part of semi-cylindrical element 170 integral to main housing 100 and shows details of means for supporting the photo tube 114 and light stop 112. It will be understood that the photo tube 113 and light stop 111 may be similarly supported.

An indicator housing 190, FIGURE 10, preferably made of aluminum encloses the coarse meter 160 and the vernier meter 140 in such a manner that they may be rotated about their axes. The outside of meter housings 140 and 160 may be machined by turning to afford a cylindrical surface. Each housing 140 and 160 are rotatably supported by a suitable bore provided in the indicator housing. A hole (not shown) is provided in coincidence with the common axes of rotation of the meter housings. The hub of a thumb screw 230, FIGURE 10, extends through this hole. The thumb screw is fastened integral to the meter housing 160. FIGURE 6, in such a manner that its rotation will cause the meter housing to rotate within the indicator housing 190. An identical thumb screw (not shown) may be fastened integral to the vernier or tine meter housing 140 to effect its rotation in response to manual rotation of the thumb screw. The conductors within the indicator housing which conduct two phase alternating current and variable phase alternating current to the stator and rotor windings respectively of the coarse and vernier meters be sufficiently flexible to allow the meters to be rotated through slightly more than 360 degrees about their axes. It is obvious that slip rings may be integrally applied to the outside diameters of the meter housings in such a manner that with suitable brushes and electrical connections thereto the motors may be rotated about their respective axes any number of revolutions desired by an operator.

The coarse indicating drum 161 is mounted integral to the rotor shaft of the coarse meter enclosed in housing 160, FIGURE 6. The vernier or fine indicating drum 165 is similarly mounted on the rotor shaft of the vernier meter enclosed in housing 140. The indicating drums which may be identical are preferably made of spun magnesium, aluminum or very thin plastic. Each drum's periphery is divided into one hundred equal spaces by one hundred graduations 162, 167 (see also FIGURE 6). The graduations 162 on the coarse drum 161 are identified by two rows of characters 250 and 251. Similarly graduations 167 on the fine drum 165 are each identified by two rows of numerical characters 252 and 253.

The first row of numerical characters 250 indicate the magnitude of the meter bar displacement in tenths of an inch (.100"), the second row of characters 251 indicates a displacement in hundreths of an inch (.0100"), the third row of characters 252 in thousandths of an inch (.0010"), while the last row of characters 253 indicates the magnitude of displacements in tenthousandths of an inch (.0001"). Each graduation is identified preferably by two characters. Thus the first graduation on either the coarse or vernier drum would be identified by numerical characters "00" while the next graduation would be identified by characters "01," etc., while characters "99" would identify the last graduation.

The outputs of the two photo tubes 113 and 114 are led to the two amplifiers 132 and 136 by a flexible shielded cable 195 while the amplifiers' dual outputs are led to the coarse and vernier meters enclosed in indicator housing 190 by a suitable flexible cable 196.

For purposes of clarity the circuits conducting direct current to the lamps and alternating current to the motor enclosed in the measuring head have been omitted from FIGURE 10. For the same reason illustrated of the two phase A.C. circuits which energize the stator windings of the coarse and vernier phase angle meters enclosed in indicator housing 190 have also been omitted.

A suitable opening is provided in the front of the indicator housing as shown in FIGURE 10 to enable the position of the indicating drums to be readily seen. A window 191 preferably of non-breakable clear glass or plastic is cemented or otherwise fastened to housing 190. A single cross hair 12 is etched or otherwise provided on the inside of the window.

The operation of the FIGURES 6–17 form will now be discussed. The pitch of the spiral convolutions impressed on the opaque face of disc 75 and the pitch of channels 95, 96 impressed diagonally along the length of meter bar 81 are identical. When motor 73 is energized with 60 cycle alternating current, disc 75 is rotated at 60 cycles per second and with proper polarity connections in a counterclockwise direction as indicated in FIGURE 2. The luminosity from lamp 122 which is projected through aperture 126 and falls upon photo tube 114 is modulated at 60 pulsations per second by the rotating alternate opaque and transparent spiral convolutions coacting with the channels 95 and 96 impressed diagonally along the meter bias length. Minimum light flux will fall upon the photo tube at the instants transparent spiral convolutions 78 are in exact register with transparent channels 95 while minimum light will be projected on this photo sensitive element at the instants the transparent convolutions of the spiral exactly register with the opaque channels 96 provided along the length of meter bar 81.

The pulsating direct current output of photo tube 114 is led to amplifier 132 whose output is an alternating current whose frequency and phase are controlled by the rotation of the disc and positioning of the meter bar at any instant. Since the disc is continuously revolved at 60 r.p.s. the frequency of the output of the amplifier can be taken to be 60 c.p.s..

Figure 16:
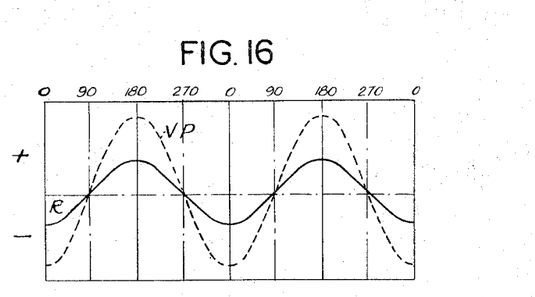
FIGURE 16 is a graph portraying a certain phase relationship of two alternating currents generated by the apparatus.
Figure 17:
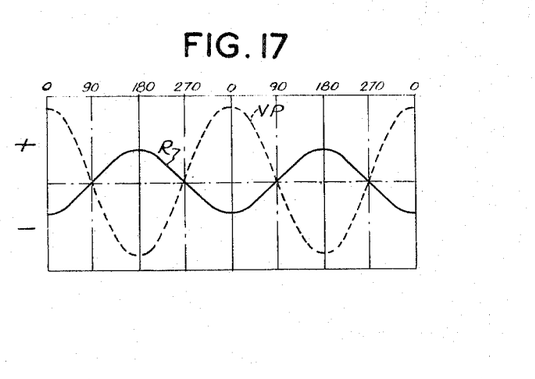
FIGURE 17 is a second graph, similar to FIGURE 16, but illustrating a different phase relationship of the same two alternating currents.

Turning to FIGURES 16 and 17, the 60 cycle alternating current supplied to synchronous motor 73 is used as a time axis or reference signal R and is so identified. The variable phase alternating current output of amplifier 132 is identified by its broken line outline and characters VP.

Assume disc 75 is so positioned on rotor shaft 76, FIGURES 6 and 11, that the transparent spiral convolutions 78, FIGURE 7, are in precise register with transparent channels 95 at the instant reference signal R, FIGURE 16, is at its maximum positive (+) value. The variable phase alternating current VP will also at the same instant be passing through its maximum positive (+) valve since maximum light flux will at this instant be falling on photo tube 114. Therefore as illustrated by FIGURE 16, R and VP are in exact phase with one another.

Now suppose meter bar 81 is displaced longitudinally along its axis a distance of .5000 L.P. or .5000×1.000 =.5000″ from left to right as viewed in FIGURE 7. This causes downward displacement of channels 95 and 96 a distance of .500 T.P. or .500×.10000=.0500″. The transparent convolutions 78 instead of being in registry with transparent channels 95 will now be in exact alignment with opaque channels 96 at the instant the reference signal is passing (as before) through its maximum positive (+) value. Obviously at this instant minimum light flux will fall upon the photo tube. FIGURE 17 illustrates that the phase of the variable phase alternating current VP has been displaced exactly 180° in response to the .500″ displacement of the meter bar.

Since coarse indicating drum 161 rotates through one degree per one electrical degree of displacement, it will be seen the .500″ displacement of the meter bar described above causes the drum to revolve through exactly 180 degrees. A 1.000″ meter bar displacement will cause drum 161 to rotate through 360 degrees; a .1000″ displacement will produce a displacement of 36° of the drum while the drum will revolve through 3.6° if the meter bar is displaced .010″, etc.

Operation of the vernier or fine system whose variable phase alternating current is controlled by displacement of channels 101 and 102, FIGURE 8, which extend along the meter bar length in zone 91 (FIGURE 6) will now be described. The images of these channels lying within area CA, FIGURES 7 and 8, are magnified ten diameters and projected in chart outline on area FCA, FIGURE 7, when lamp 106 is excited with direct current from battery 105. At area FCA these magnified images are substantially parallel (neglecting the slight curvature of the spiral convolutions lying within the area of aperture 121, FIGURE 7) to the spiral convolutions. The pitch of the magnified images of channels 101 and 102 exactly equal the pitch of the convolutions of the opaque and transparent spirals upon which they are superimposed.

Rotation of the spiral convolutions impressed on the face of the disc 75 through 360° causes the magnitude of the light projected through the aperture 121 to the photo tube 113 to pass from maximum to minimum and back to maximum. Therefore the luminosity falling upon this photo tube is varied in the same manner the light projected on photo tube 114 is modulated. Since the images of channels 101 and 102 are as stated magnified ten times it becomes apparent that their displacements due to movement of meter bar 81 will also be magnified by the same factor. If the meter bar is displaced horizontally a distance of exactly .0100″ the magnified images of the channels 101 and 102 will also be horizontally displaced but through a distance of .1000″ in relation to the spiral convolutions lying within the area of aperture 121, FIGURE 7, upon which they are superimposed. From the operation of the system controlling the coarse drum 161 it will be seen as a displacement of the meter bar through a distance of .0100″ will produce a phase shift of 360 electrical degrees of the variable phase alternating current output of amplifier 136 in relation to the two phase alternating current impressed on the stator windings 157, 158, FIGURE 11, of the vernier phase angle meter. This 360 degree phase shift will instantly cause vernier indicating drum 167 to rotate through 360 degrees. Since a displacement of the meter bar of .0100″ causes a complete rotation of the vernier drum, a .0050″ meter bar displacement will cause the vernier drum to rotate 180°, while a displacement of .0001″ imparted to the meter bar will produce a 3.6 degree angular displacement of this drum, etc.

Figure 13:
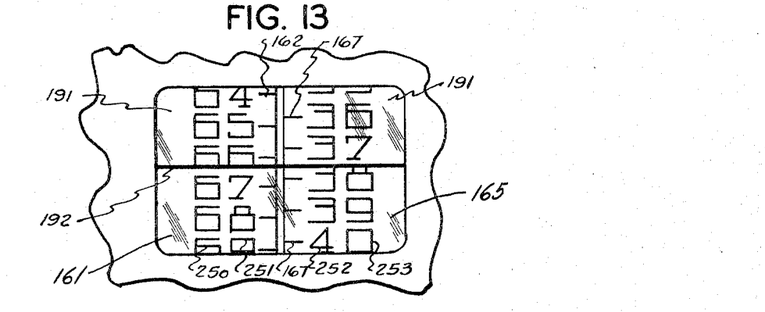
FIGURE 13 is a broken section and illustrates certain details of an indicating instrument adapted to visually indicate the magnitude of certain linear displacements.

The peripheries of the coarse and vernier drums 161 and 165 are both divided, as stated, into one hundred equal divisions by provision of one hundred graduations 162 and 167, FIGURE 13. Since the coarse indicating drum rotates through 360 degrees per 1.000″ displacement of meter bar 81, each division equals .0100″. The vernier drum, however, rotates through 360 degrees when the meter bar is displaced .0100″. Therefore, each division on the vernier drum periphery equals $$\tfrac{1}{100} \times .0100 = .0001''$$

Displacement of the meter bar in a direction from left to right as viewed in FIGURE 7, causes channels 95 and 96 lying within the confines of aperture 126 to be downwardly displaced in a direction opposite to that of arrow DS which indicates the direction of radial displacement of the spiral convolutions when they are rotated in the counter clockwise direction indicated on this figure. This meter bar displacement also causes the magnified images of channels 101, 102 in FIGURE 8 to be displaced in a direction opposite to that of arrow KS in FIGURE 7. Movement of the meter bar from left to right therefore causes the alternating currents outputs of the two amplifiers to be shifted in phase in a "leading" direction in relation to the two phase alternating current which, as stated, serves as the reference signal. Conversely, opposite displacement of the meter bar causes the alternating current outputs of the amplifiers to be shifted in phase in relation to be reference signal in the opposite or "lagging" direction. With proper polarity connections to the two phase angle meters, their indicating drums 161 and 165. FIGURE 6, can be made to appear to rotate in the direction indicated by arrows KM when the meter bar is displaced from left to right while opposite linear displacement of the meter bar will appear to cause opposite rotation of the drums.

Figure 12:
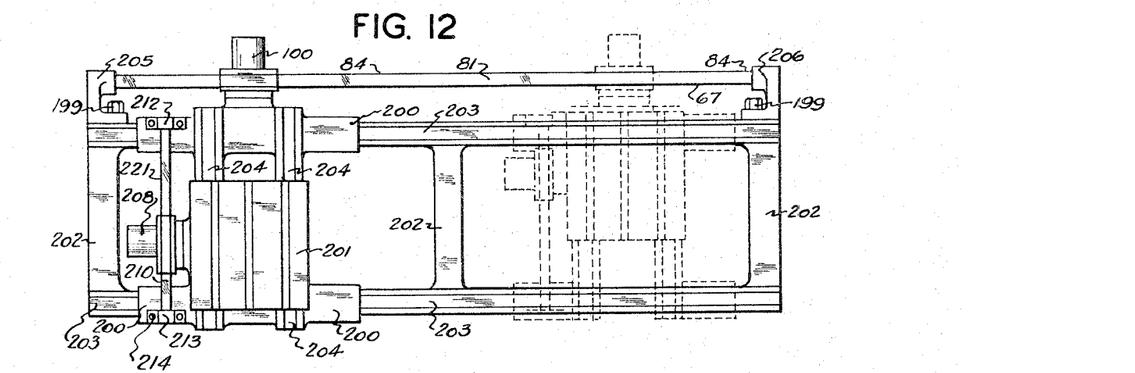
FIGURE 12 is a plan view of a machine tool and certain measuring elements of the system constituting the invention.

A possible application of the system to a machine tool will now be discussed. FIGURE 12 illustrates in plan, certain elements of a machine tool which may be various parts of a lathe, grinder, router, milling machine, jig borer or similar fabricating machine. It will, for purposes of description, be considered to illustrate the bed, carriage and slide of a lathe. For the purpose of clarity the head and tail stock have been omitted. For the same reason the illustration of lead screws, hydraulic or pneumatic cylinders, racks or other devices used to impart linear displacement to slidable machine tool members have also been omitted from this figure.

Two spaced parallel ways 203, FIGURE 12, are provided on which a carriage 200 is slidably supported. Ribs 202 separate the ways 203, as shown. Two spaced parallel ways 203 are provided on the carriage 200 which slidably support a cross slide 201 upon which a tool post (not shown) would be normally fastened. The axes of ways 204 are transverse to ways 203 as shown. Two suitable metal brackets 205 and 206 are fastened integral to the bed of the lathe by means of suitable bolts 199. These brackets rigidly support a horizontally extending meter bar 81 in exact parallelism to ways 203. The opaque vertical face 84 of the meter bar lies adjacent to housing 100 of a measuring head, which is rigidly fastened to carriage 200 in such a manner that it can freely slide along the length of meter bar 81 with minimum friction in response to any movements of the carriage along ways 203. Two similar brackets 212, 213, fastened to the carriage by screws support a second meter bar 210 in precise parallelism to ways 204 on the carriage. The opaque vertical face 221 of the meter bar 210 is adjacent to housing 208 of a second measuring head which is rigidly fastened to slide 201 as shown.

Illustration of amplifiers, indicating instrument housings and essential electrical connections and circuits have been purposely omitted from FIGURE 12. However, it will be understood that the two meter bars and two measuring heads shown in this figure operate in conjunction with electronic amplifiers and indicator housings similar to those fully described. Thus, the dual photo tube output of the measuring head operating in conjunction with meter bar 81 in FIGURE 12 are separately led to two amplifiers. One amplifier output is led to a coarse phase angle meter while the other output of the second amplifier is led to a vernier or fine phase angle meter. The coarse and vernier indicating drums whose rotations are controlled by the two phase angle meters thus visually indicate the magnitude of any linear displacements of carriage 200 along the ways 203. Similarly, any movement of the slide 201 and the second measuring head which it rigidly supports, causes proportional rotation of a second set of coarse and vernier indicating drums. In this manner any linear displacements of the carriage and slide are continuously measured and visually indicated in tenths, hundredths, thousandths and ten-thousandths of an inch to the tool operator. Two separate scales (not shown), one extending parallel to meter bar 81, the other parallel to meter bar 210 and graduated in inches may operate in conjunction with two suitable pointers, one affixed to carriage 200, the other to slide 201, would enable the displacements of the carriage and slide to the indicated in units of one inch, while the indicating drums controlled by the two measuring heads would visually indicate the magnitude of the displacements to within .0001".

Other types of instruments adapted to visually indicate the phase relationship of a variable phase alternating current in relation to a reference signal can be used in lieu of the orthodox type of phase angle meter herein described and illustrated. Thus, the output of photo tube 114 in FIGURE 6, for instance, can be used to "trigger" or control the firing of a stroboscopic source of illumination in such a manner that the rotation of an indicating drum affixed to the same rotating shaft to which disc 75 is integrally mounted, would be caused to appear "stopped," such as in the FIGURE 1 through 5 form.

Figure 18:
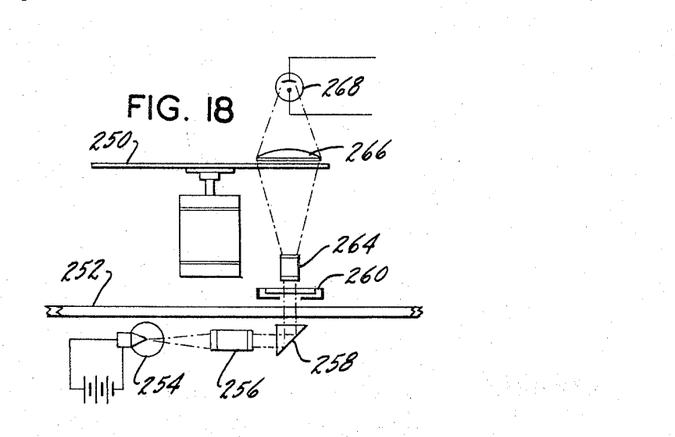
FIGURE 18 illustrates another embodiment of the invention.
Figure 19:
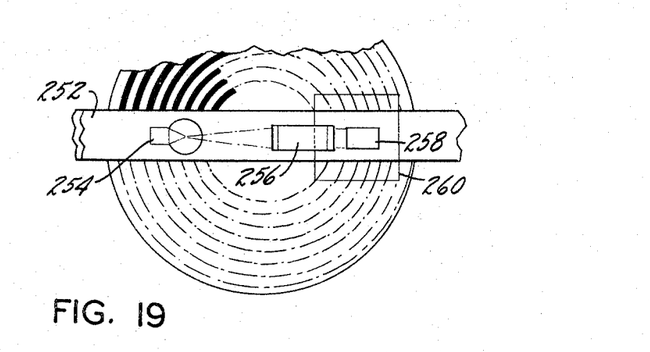
FIGURE 19 illustrates a plan view of certain portions of the system shown in FIGURE 18.
Figure 20:
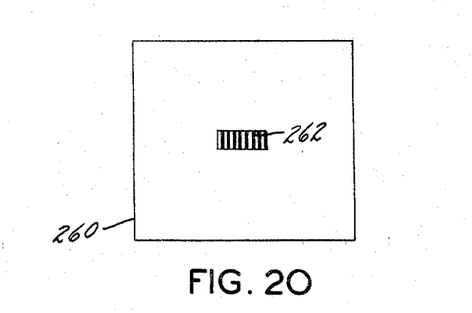
FIGURE 20 is a detail view of one of the elements employed in the system of FIGURES 18 and 19.

FIGURES 18, 19 and 20 illustrate an embodiment of the system using a scanner in the form of an Archimedes' spiral 250 similar to the scanner 2 of FIGURE 1 and is similar to and a variation of the FIGURE 10 form. The meter bar 252 in this embodiment is, however, provided with alternate opaque and transparent areas, which are spaced at a pitch of .01 inch as is represented in FIGURE 20. A light source 254 projects light through a collimating lens 256, through a prism 258 and the meter bar. Light is projected through the light flux transmissive areas in the meter bar and through a light shield 260, which has a slot 262 (FIGURE 20) for transmitting the light image therethrough. A magnifying lens 264 capable of magnifying the image received by 10 diameters projects the image received through the scanning disc 250. The image projected on the disc will be similar to that shown in FIGURE 20, except with the magnification of 10 diameters. The image will thus be a series of alternate light and dark areas at a pitch equal to the pitch of the spiral. The light which passes through the scanning disc 250 is focused by a lens 266 on a photocell 268. Movement of the light transmissive areas of the spiral across the image projected on the spiral has the effect of modulating the light flux transmitted to the photocell 268 in a manner similar to the operation in FIGURES 1, 2 and 3. With the system shown in FIGURES 18, 19 and 20 a 360 degree phase change in the signal is obtained with a .01 inch movement of the meter bar 250 with respect to the scanner. Thus the reading of this displacement may be presented accurately in $\frac{1}{10,000}$ of an inch increments by using indicators of the type previously described.

Whereas particular dimensions have been mentioned in describing the system it should be understood that these dimensions are to be taken in an exemplary sense only and not in any limiting sense. For example, where reference has been made to inches, 10ths of inches and 100ths of inches, this is only representative of multiples and submultiples of units of linear measurement. The units employed can be those of the metric system. Furthermore, the indicating instrumentalities may be calibrated, if desired, in terms of feet, inches, etc.

An oscilloscope may also under certain conditions be used in the various forms of the invention to not only translate variable phase relationships (existing between alternating currents which are proportional to linear displacements) into visual indications of the magnitude of longitudinal displacements, but it can also be utilized to graph such magnitudes on a chart for permanent recording. Methods and means for accomplishing this result are divulged in the U.S. Patent No. 2,628,539, issued February 17, 1953.

The use of flux interrupting members having only one single multi convolution spiral has been described and illustrated herein. However, it will be understood that double, triple, quadruple or even larger number of spirals can be used, if desired. It will be understood that the systems herein described can be adapted to measure linear displacements in units of linear measurement of the metric system (or any other system) if desired. In that case, the pitch of the spiral flux interrupting members and the pitch of flux transmissive, non-transmissive elements arranged along the length of the meter bar would be, for instance, 1 centimeter, or 1 millimeter, etc.

In the production of meter bars and their coacting rotary flux interrupters, it will be found that errors in the spacing, profiles or outlines of alternate flux transmissive and non-transmissive elements impressed thereon can be reduced almost to the vanishing point by causing a large number of rotated, flux transmitting spiral convolutions to cooperate simultaneously with a similar number of alternate flux transmissive and non-transmissive elements arranged along the length of a meter bar to effect modulation of the flux. In FIGURE 7 as an example, the length of aperture 126 in the light stop is such that exactly five pitches of the transparent and opaque convolutions 78 and 80, and a similar number of pitches of the alternate transparent and opaque channels 95, 96 are accommodated at any instant. It will be seen that any slight error in the pitch of one of the convolutions or channels will be reduced to one-fifth by the averaging effect of the other four perfect pitches. It will be found that the optimum number of spiral convolutions 78, 80 cooperating at any instant with a similar number of spaced channels 95, 96 is at least ten. Thus, although the lengths of apertures 121 and 126 in FIGURE 7 are shown for purposes of illustration to equal five pitches, it will be understood that their length should be equal to at least ten pitches in order to obtain the highest degree of accuracy of which the system is capable. This method of minimizing errors in the spacing of the flux interrupting elements provided on the meter bar and rotary member is of very great importance.

Although the use of a two phase alternating current from a commercial source is illustrated and has been alluded to in the description of the measuring system, it will be understood that such a source is not essential. Thus the disc 75 could be mounted integral to the shaft of a two phase alternator which could be driven by a belt, electric motor or any other suitable means. Since the discs whose rotation controls the frequency of the variable phase alternating current is mounted integral to the two phase alternator shaft, it will be seen that changes in its rate of rotation from instant to instant will not affect the operation of the complete measuring system since the two phase alternator which generates the reference signal of the system is rotated at all times at the same rate as the disc.

Although not illustrated, it will be understood that the rotor shaft 76 of the two pole synchronous motor 73 is rotatably supported, preferably by precision type ball bearings which may be spring loaded to eliminate axial or radial play. The ball bearings should also preferably be of the "cartridge" type so that the original supply of grease can be depended upon to furnish trouble free operation of the motor for many years of operation.

As illustrated and described, a small clearance may be provided between the rotary flux interrupter such as disc 75, and its coacting meter bar. Since there is no physical contact between these elements which constitutes the measuring elements per se, it will be seen that no wear can ever take place in these elements to affect the accuracies of the systems herein disclosed.

Since the positioning of the various types of indicating means of the systems herein described and illustrated is controlled by the phase of one alternating current in relation to one or more other alternating currents, it is manifest that the indicating instruments can be situated a great distance from the measuring units if desired, and also that more than one indicating instrument can be provided at separated points to visually indicate the same linear displacements. This is of great importance since the indicating means can be positioned at any point on, or external to, a machine tool where it may be most conveniently read.

Although not illustrated, it should be understood that the leads between photo tubes 113 and 114, and their amplifiers should be shielded and as short as possible to reduce extraneous pickup to the minimum. These photo tubes should also be preferably spring mounted in such a manner that no mechanical vibration is transmitted to them to obviate microphonic pickup. The amplifiers should be supplied with direct current for the filaments of the amplifying tubes to preclude the pickup of extraneous signals.

It will be understood that the methods and means described and illustrated in the instant disclosure can be utilized in many different types of measuring devices such as inside and outside micrometers, depth micrometers, thread gauges, bench inspection gauges, height gauges, etc. It will also be understood that the systems herein disclosed are also suitable for measuring and visually indicating the linear movement of various measuring elements which are displaced in response to physical changes such as pressure, temperature, and density. Thus, as an example, changes in the length of a metallic bellows in response to changes in pressure of a gas could be very accurately measured and then visually indicated at a point remote from the bellows.

In the specification, the principles of the invention and the best mode in which it is contemplated applying those principles has been explained, so as to distinguish this invention from other inventions; and the part, improvement or combination which is claimed as the invention or discovery has been particularly pointed out and distinctly claimed.

In the specification and claims, on occasion, the term "lineal" or "lineally extending member" or words of this type have been used to describe or refer to the meter bar. But it should be understood that it might be circular or annular or in the form of a disc with the track or tracks continuous or disconnected arcs. Accordingly, in the claims the terms "lineal," "lineally," "longitudinal" and the like should be interpreted to describe and cover a curved as well as a rectilinear track. Also, while a spiral has been shown in all forms and described, it might be a helix on a cylindrical drum, and the claims should be interpreted accordingly.

While certain preferred embodiments of the invention have been should and described, it will be understood that modifications and changes may be made without departing from the spirit and scope thereof, as will be clear to those skilled in the art.

What is claimed is:

1. A signal generating element for use with electrical measuring systems, including an elongated member having a first series of spaced and parallel areas thereon transmissive to light flux and said areas being inclined to the longitudinal axis of the member, a second series of spaced and generally parallel areas thereon also transmissive to light flux and inclined to the longitudinal axis of the member, the areas of said first series having a slope, with respect to the longitudinal axis of the member, equal to a unit of linear measurement taken transversely of the member for a predetermined quantity of linear measurement taken longitudinally of the member, the areas of said second series having a slope of a submultiple of the unit of linear measurement taken transversely of the member for each said predetermined quantity of linear measurement taken along the longitudinal axis of said member, and a third series of spaced and generally parallel areas thereon also transmissive to light flux.

2. The structure of claim 1 wherein the areas of said third series of spaced and generally parallel areas each extend generally parallel to the longitudinal axis of the member.

References Cited by the Examiner

UNITED STATES PATENTS

| 2,131,911 | 10/1938 | Ayres | 250—233 X |
| 2,155,471 | 4/1939 | Cawley. | |
| 2,295,000 | 9/1942 | Morse | 250—232 X |
| 2,416,968 | 3/1947 | Turrettini. | |
| 2,468,042 | 4/1949 | Cranberg | 88—14 X |
| 2,592,339 | 4/1952 | Rollat. | |
| 2,628,539 | 2/1953 | De Neergaard. | |
| 2,659,072 | 11/1953 | Coales et al. | |
| 2,734,188 | 2/1956 | Jacobs | 340—190 X |
| 2,755,020 | 7/1956 | Belcher | 340—190 X |

FOREIGN PATENTS 575,977  5/1933  Germany.

ROBERT B. HULL, *Primary Examiner.*